United States Patent [19]

Logan et al.

[11] Patent Number: 4,575,730

[45] Date of Patent: Mar. 11, 1986

[54] INK JET PRINTING RANDOMIZING DROPLET PLACEMENT APPARATUS

[75] Inventors: David J. Logan, Glastonbury; Leonard G. Rich, West Hartford, both of Conn.

[73] Assignee: Metromedia, Inc., Secaucus, N.J.

[21] Appl. No.: 671,291

[22] Filed: Nov. 14, 1984

[51] Int. Cl.[4] .......... G01D 15/18

[52] U.S. Cl. .......... 346/75; 346/140 R

[58] Field of Search .......... 346/75, 40 R; 358/300; 364/900

[56] References Cited

U.S. PATENT DOCUMENTS

| | | | |
|---|---|---|---|
| 3,864,692 | 2/1975 | McDonnell et al. | 346/75 |
| 3,898,671 | 8/1975 | Berry et al. | 346/75 |
| 4,281,331 | 2/1981 | Shair | 346/75 |
| 4,374,387 | 2/1983 | Iyoda et al. | 346/75 |
| 4,414,583 | 11/1983 | Hooker | 358/300 |
| 4,424,578 | 1/1984 | Suzuki et al. | 346/75 |
| 4,476,542 | 10/1984 | Crean et al. | 364/900 |

*Primary Examiner*—E. A. Goldberg
*Assistant Examiner*—Gerald E. Preston
*Attorney, Agent, or Firm*—McCormick, Paulding & Huber

[57] ABSTRACT

Ink jet printing apparatus is provided for vertically randomizing the flight paths of ink drops ejected from an ink jet printing head to print dots at positions randomly deviated vertically with respect to a line scanned by the printing head. Ejected ink drops are passed through an electric field having a randomly varying intensity and direction to randomly deflect the ink drop flight path with respect to a line scanned by the printing head.

13 Claims, 10 Drawing Figures

INK JET PRINTING RANDOMIZING DROPLET PLACEMENT APPARATUS

BACKGROUND OF THE INVENTION

The present invention relates to ink jet printing and deals more specifically with apparatus for vertically randomizing the flight path of an ink drop ejected from a printing means.

Graphics, particularly large-scale color graphics, such as outdoor advertising billboards and signs or displays used in large open areas such as shopping malls and airports, produced by an ink jet system are often not of high quality and have a corduroy texture or washboard appearance.

One ink jet printing system for producing large-scale graphics moves a receiving surface relative to an ink jet printing station in a continuous, line scanning fashion to print a line. The printing station generally has a number of ink jet printing heads which may be arranged to print the same color for monochromatic graphics or which may be arranged to print a number of colors in a polychromatic halftone manner such as generally described in prior U.S. Pat. No. 4,367,482 to produce polychromatic graphics. In actuality, each printed line is really a horizontal band which is made up of a number of pixel areas arranged end-to-end and located sequentially along the scan line. Potential dot positions form an array of rows and columns identical for all pixel areas and each row of the array is associated with one printing head of a group of heads comprising the printing station. As each printer head moves along a scan line it moves past a succesion of points on the line in relation to each of which the printer head may (or may not) eject a relatively large volume drop of ink to apply dots of substantially fixed size onto the surface at the dot position. At the completion of the printing of the line, the printing station moves downwardly a distance equal to the height of the printed line and the next group of lines associated with the rows forming a pixel area is printed immediately adjacent to the previous group. A large number of such side-by-side printed lines form the desired sign or display.

An ink drop printed at a dot position on the surface is not a uniform thickness due to the thixotropic properties and surface tension generally characterizing pigmented inks and exhibits density variations across its surface with the density being higher at the dot center than at its periphery. Consequently, a printed line may exhibit a lower density along its edges than at its center and the region or gap between adjacent printed lines may be lighter than the centers of the lines. The repetitive lighter gaps can produce a corduroy texture appearance in the completed graphic.

It is therfore a general aim of the present invention to provide an ink jet printing apparatus for vertically randomizing the flight path of an ink drop to print dots in a vertically randomly deviated manner with respect to a line scanned by an ink jet head to substantially eliminate the corduroy texture appearance that is produced by the repetitive lighter gaps between adjacent printed lines.

Other objects and advantages of the invention will become readily apparent from the following description and claims taken in conjunction with the accompanying drawings.

SUMMARY OF THE INVENTION

The present invention resides in an ink jet printing apparatus for controlling the flight path of an ink drop ejected from an ink jet printing head. The printing head is operated in response to control means to selectively apply or not apply dots to a number of dot positions located sequentially along a line scanned by the printing head.

In accordance with the present invention, the flight paths of ink drops ejected from a printing head are vertically randomized to print dots at positions randomly deviated vertically with respect to a line scanned by the printing head. In one embodiment of the invention, means electrostatically charge an ink drop ejected from a printing head and the drop is deflected as it passes through an electric field which is created between deflection plates. A variable amplitude control means is coupled to a deflection voltage source means to produce a randomly varying intensity bipolar electric field in a vertical direction perpendicular to the line of flight to randomly deflect the ink drop flight path in a first and opposite direction respectively with respect to a line scanned by the printing head.

DETAILED DESCRIPTION OF THE DRAWINGS

Figure 1:
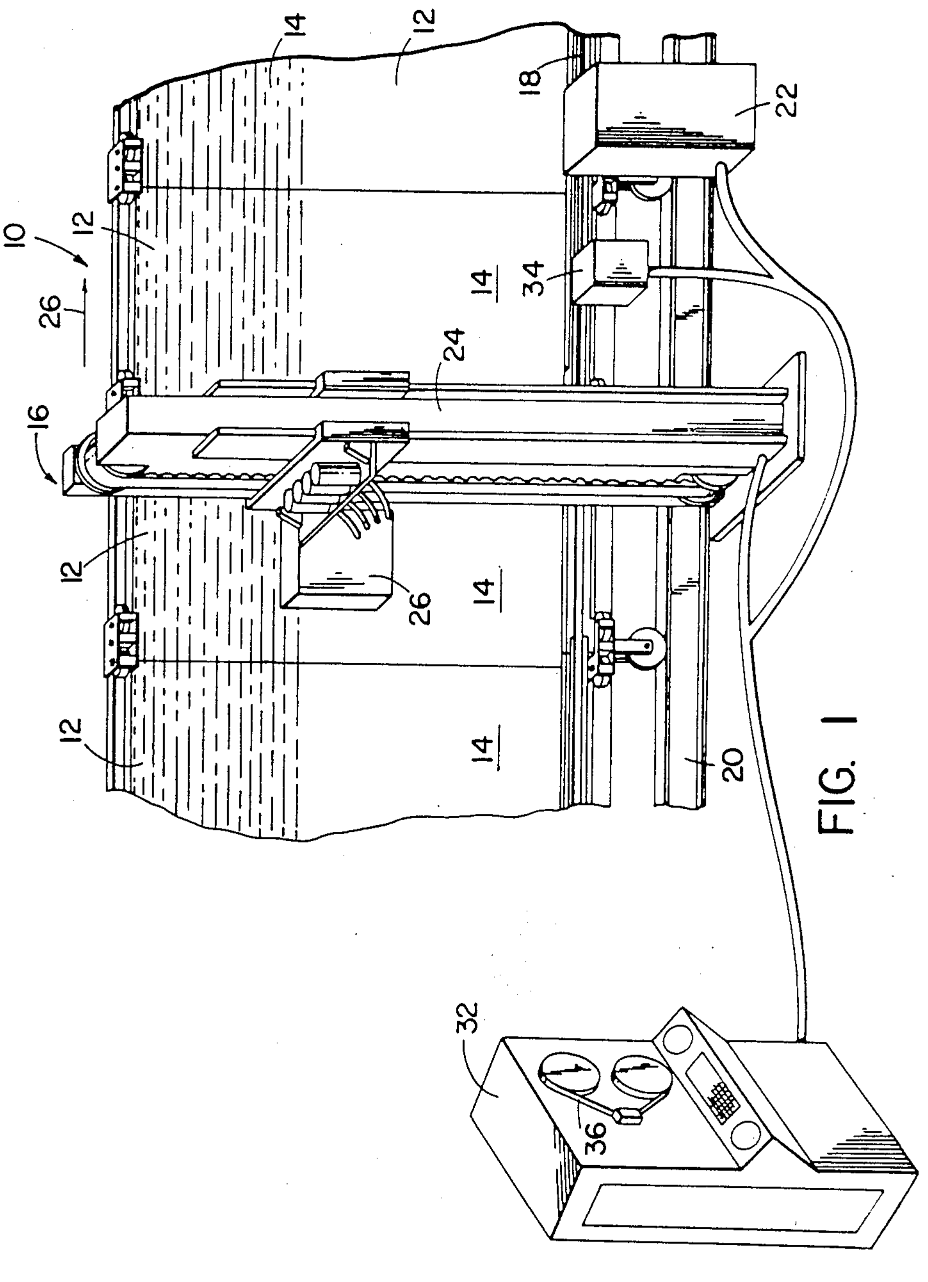
FIG. 1 is a fragmentary perspective view of a large-scale graphics generating ink jet printing system embodying the present invention.

Referring now to FIG. 1, the ink jet printing apparatus of the present invention is shown by way of example as embodied in a large scale graphics generating ink jet printing system designated generally by the numeral 10. Briefly, a plurality of flat panels 12, 12 collectively providing a receiving surface 14 move in an endless path edgewise and rectilinearly in succession past an ink jet printing station 16. The panels 12, 12 are moved on an endless carrier 18 supported by a track 20 and propelled by a power unit 22 located near the printing station 16. The printing station 16 includes a vertical column 20 for slideably supporting a carriage 26 for vertical movement relative to the column, the carriage 26 in turn supporting at least one ink jet head for printing ink dots of substantially fixed size onto the outwardly directed surface 14 of each panel 12 as it passes the printing station. During operation of the system, the panels move in the direction of arrow 26, and each ink jet printing head of the printing station ejects ink drops onto the faces of the panels with the drops moving from the nozzle to a panel along a substantially horizontal line of flight, so that each time a panel passes the printing station the drops ejected by a printing head, if it is operating at that time, fall on a horizontal scan line. Further, the vertical movement of the carriage 26 and of the carrier 18 is coordinated so that with each full revolution of the carrier about its endless path, the carriage 26 is moved downwardly by a given increment so that each time a panel passes the printing station each ink jet printing head of the printing station scans a line on the panel which is new to it.

The operation of the ink jet printing heads and the movement of the carriage 26 is controlled by a controller such as, for example, a computer 32. Timing of the excitation of the printing heads is slaved to the motion of the carrier 18 and to a carrier position encoder unit 34. Graphics information controlling the excitation of the ink jet printing heads to cause each head to either print or not print a dot at each potential dot position on the surface of each panel maybe supplied to the controller 32 in various different ways. For example, it maybe in the form of preprocessed information recorded onto a magnetic tape 36 read by the controller.

Figure 3:
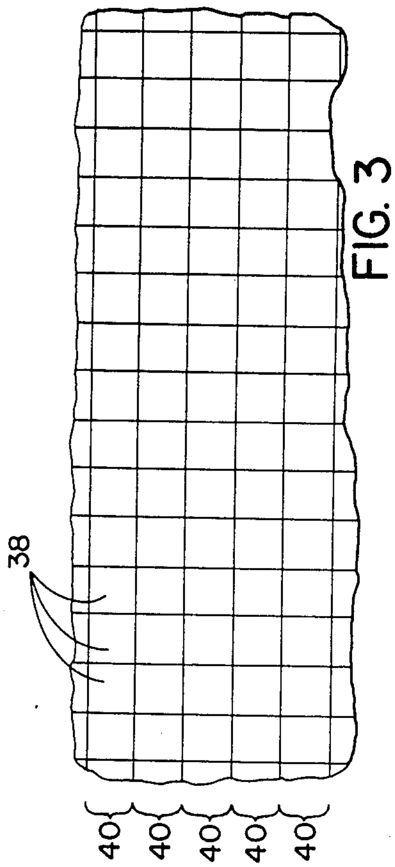
FIG. 3 is an enlarged fragmentary view showing a portion of a receiving surface and illustrating the manner in which such surface is divided into pixels through the operation of the system of FIG. 1.
Figure 2:
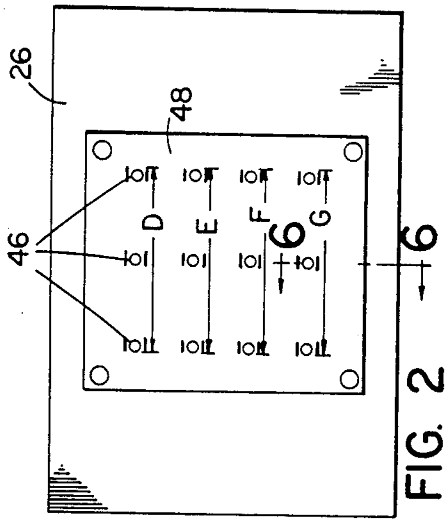
FIG. 2 is a schematic front view of the ink jet printing head arrangement used in the printing station of FIG. 1.

By way of illustration and example it is assumed in the following discussion that the graphics generating system of FIG. 1 generates polychromatic graphics and it is further assumed that the printing station 16 has twelve ink jet printing heads for printing four different colors used in the production of polychromatic halftone graphics, the colors being cyan, magenta, yellow and black. As shown in FIG. 2, nozzles 46, 46 associated with the printing heads are arranged such that three heads print black, three print cyan, three print magenta and three print yellow. It is also assumed that the halftone printing process involves the use of square pixels measuring one-tenth inch on a side. The pixels are indicated generally at 38, 38 in FIG. 3 and are arranged in end-to-end successive side-by-side horizontal lines or bands 40, 40.

Figure 4:
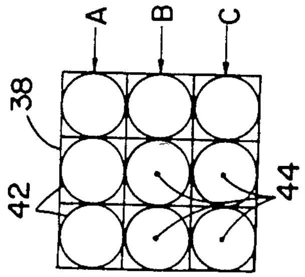
FIG. 4 is an illustration showing the arrangement of potential dot positions within one of the pixels of FIG. 3.

Referring to FIG. 4, each pixel 38, which is one-tenth of an inch square, contains nine potential dot positions represented generally by the circles 42, 42, having centers 44, 44, the centers 44 therefore being spaced 0.033 inches from one another along both horizontal and vertical lines. In each pixel there are three horizontal lines, A, B and C each line containing three dot positions 42, 42. Although not evident in FIG. 2, the three nozzles 46, 46 of each row D, E, F and G are vertically spaced from one another by a distance of 0.033 inches so that as a receiving surface passes the printing station the three nozzles 46, 46 of a row such as the row D, if operated, print ink dots respectively along the three different lines A, B and C of the associated band 40 of pixels. That is, in each row, as viewed in FIG. 2, the left nozzle 46 may be the lowest one, the middle nozzle may be positioned 0.033 inches above the left one, and the right nozzle may be the highest one positioned 0.033 inches above the middle one. Therefore, in each pixel the left nozzle 46 will print the lower line C of dot positions, the middle nozzle will print the middle line B of dot positions and the right nozzle will print the upper line A of dot positions and each dot position of a pixel is printed only if desired in accordance with the graphic information supplied to the controller 32. The horizontal spacing between the dot positions appearing on a line A, B or C is determined by the slaving of the printer head excitation to the movement of the carrier and such exitation is such that each time the carrier moves 0.033 inches relative to the printing station, a decision is made as to whether or not each printing head is to be actuated.

Figure 5A:
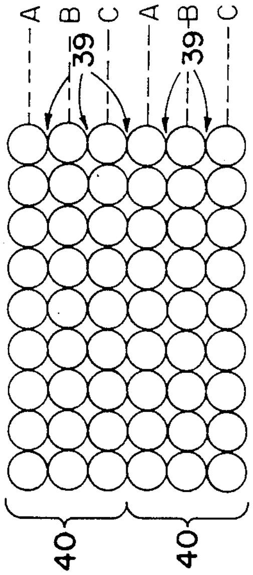
FIG. 5*a* is an enlarged fragmentary view showing a portion of several scan lines of FIG. 3 and illustrating the lighter gap appearing between adjacent printed lines.
Figure 5B:
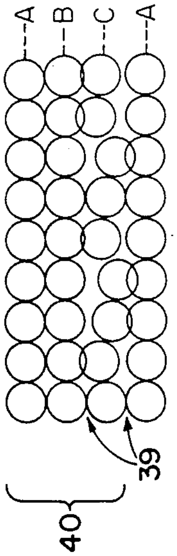
FIG. 5*b* shows the scan lines of FIG. 5*a* where the flight path of ink drops associated with the ink jet printing head printing the lower line of dot positions is vertically randomized to print dots in the lighter gaps appearing between adjacent printed lines.
Figure 5C:
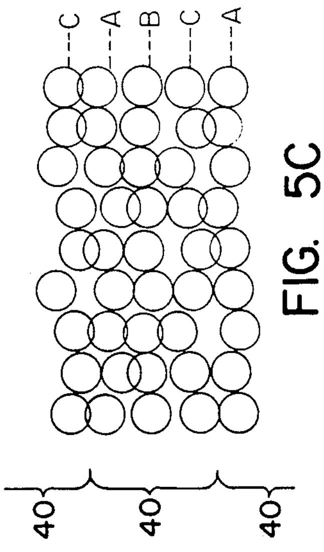
FIG. 5*c* shows the scan lines of FIG. 5*a* where the flight paths of ink drops associated with all the printing heads are vertically randomized to print dots in the lighter gaps appearing between adjacent printed lines.

Referring now to FIGS. 5*a–c*, a portion of several side-by-side pixel bands 40, 40 are shown and each band 40 is made up of ink dots printed along three different lines A, B and C, the lines A, B and C representing the scanning lines of the associated ink jet printing heads and nozzles 46, 46. In FIG. 5*a*, the pixel bands 40, 40 are only printed at potential dot positions along the lines A, B and C and lighter gaps 39, 39 appear from line-to-line due to the density variations of the dots printed along each line.

In accordance with the invention, the flight path of an ink drop ejected from one of the ink jet printing heads associated with printing the upper and/or lower lines of a pixel is vertically randomized with respect to its ink jet head scanning line to print either on and above and/or on and below the scanning line as illustrated in FIGS. 5*b* and 5*c*.

In FIG. 5*b*, the ink drop flight path of the ink jet printing head associated with printing dots along one line, for example, line C is vertically randomized to print dots on, above or below line C with some of the dots being printed in the lighter gaps 39, 39 appearing above and below line C. Although the ink drop flight path associated with dots printing along line C is randomized to darken the lighter gaps 39, 39 above and below line C by overlapping some dots associated with line B above and some dots associated with line A below, a lighter gap 39 remains between line A and line B. It is preferable therefore, to vertically randomize the ink drop flight paths associated with printing all the lines to substantially eliminate the corduroy texture appearance that is produced by repetitive lighter gaps.

In FIG. 5*c*, the ink drop flight paths of the ink jet printing heads associated with printing dots along lines A, B and C are vertically randomized. The ink drop flight paths associated with printing dots along lines A, B and C are randomized to print on, above and below lines A, B and C respectively with some of the dots associated with line A overlapping some of the dots associated with line C above and line B below; and with some of the dots associated with line B overlapping some of the dots associated with line A above and line C below; and with some of the dots associated with line C overlapping some of the dots associated with line B above and line A below.

Figure 6A:
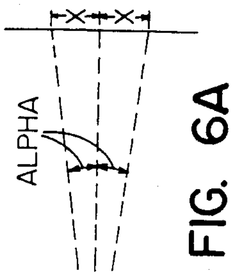
FIG. 6*a* is an enlarged fragmentary view showing the maximum flight path deflection angle of FIG. 6 to print a dot within a predetermined distance of a dot printed without deflection.
Figure 6:
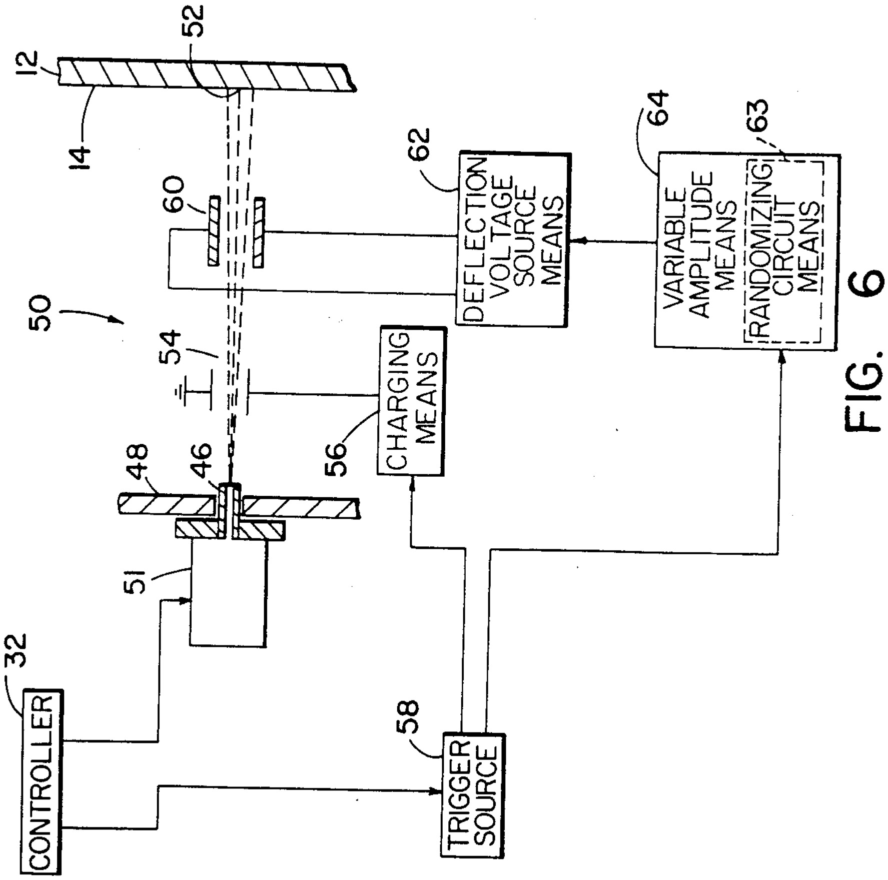
FIG. 6 is in part a view taken along the line 6—6 of FIG. 2 showing one of the ink jet printing heads of the printing station of FIG. 1 and in part a schematic diagram partly in block diagram form of apparatus embodying the present invention.

Considering now FIG. 6, one embodiment of an ink jet printing apparatus for vertically randomizing an ink drop flight path is shown therein and is designated generally by the numeral 50. An ink jet head 51 is, as are all eleven other of the heads, shown generally mounted to a mounting plate 48 with its nozzle 46 extending through the plate and directed to the passing surface 14 of a panel 12 so that an ink drop ejected from the nozzle 46 moves from the nozzle to the surface 14 along a generally horizontal flight path 52 in the absence of any path deflection provided by the apparatus 50. The apparatus 50 includes charging electrodes 54 which electrodes are supplied with a charging voltage from a charging means 56 to electrostatically charge an ink drop passing between the electrodes. The charging means 56 generates a charging voltage in timed response to a signal received from a trigger means 58 which trigger means itself is responsive to information provided from the controller 32. Deflection plates 60 are connected to a deflection voltage source means 62 which source generates an electrical potential to create an electric field between the two plates to deflect an ink drop passing between the plates.

The amount and direction of the ink drop deflection is dependent on the magnitude and direction of the electric field created between the deflection plates 60. The magnitude of the deflection voltage and accordingly the intensity of the electric field is controlled by a variable amplitude controller means 64 which controller means is in turn activated by a signal from the trigger means 58. The activating signal is delayed for an amount of time equal to the time it takes the ink drop to move from the ink jet head 51 to the deflection plates 60 so that the ink drop deflected is the ink drop associated with the dot position to be printed.

In accordance with the present invention, the variable amplitude controller means 64 causes the deflection voltage source means 62 to generate an electric potential of one polarity for producing a bipolar electric field having a direction to deflect an ink drop in one direction and an opposite polarity to deflect an ink drop in the opposite direction respectively with respect to an ink jet head scan line. The amount that an ink drop flight path is deflected is proportional to the magnitude of the electric potential applied to the deflection plates 60. The maximum potential supplied to the deflection plates 60 is predetermined to limit the ink drop flight path deflection to a maximum angle ALPHA as illustrated in FIG. 6*a*, above and below the horizontal flight path 52. A flight path deflection angle equal to or less than the maximum angle ALPHA corresponds to a dot being printed on the surface 14 within a maximum distance X above or below a dot printed with a horizontal flight path.

Randomizing circuit means 63 within the variable amplitude controller means 64 causes the deflection voltage source means 62 to produce a randomly varying magnitude electric potential to create a bipolar electric field having a randomly varying intensity and direction so that charged ink drops passing through the plates 60 are deflected to print dots at positions randomly deviated vertically with respect to an ink jet scanning line.

Such randomizing circuit means 63 might comprise, for example, a programmable variable resistance network connected in series with the deflection source means 62 to vary the magnitude of the electric potential supplied to the deflection plates 60 as the resistance is varied. In one case, the resistance is varied in accordance with a random number selected from a set of random numbers contained, for example, in a PROM look-up table and each number is represented by the presence or absence of a signal in each of the bit positions which comprise the number in a digital format. The magnitude can also be varied using a white noise generator or a digital pseudo random electric potential sequence generator. A polarity reversing means such as a switch is included in the circuit means 63 to cause the deflection source means output electric potential to randomly change polarity in response to the presence or absence of a signal in a predetermined bit position in a random number selected from the look-up table.

Figure 7:
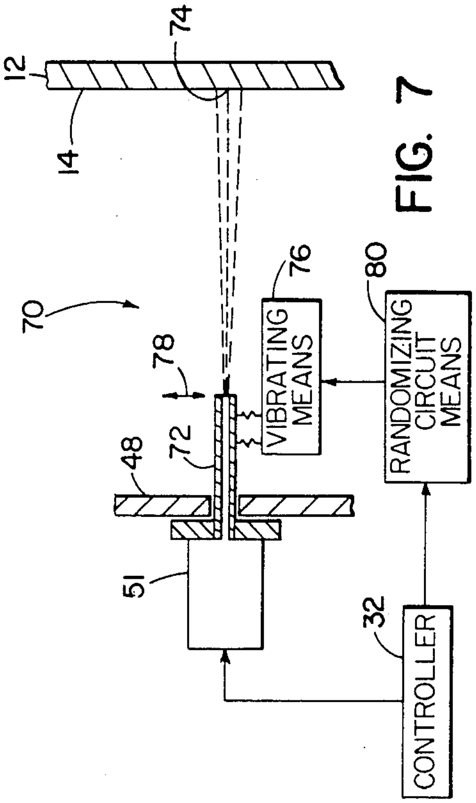
FIG. 7 is another embodiment of the present invention and shows apparatus for vibrating the nozzle of an ink jet head to randomize the flight path of ink drops ejected from the nozzle.

Referring now to FIG. 7, ink jet printing apparatus for vertically randomizing an ink drop flight path is shown in another embodiment and is designated generally by the numeral 70. An ink jet head 51 of the type described above is, as are all eleven other of the heads in the printing station, shown generally mounted to a mounting plate 48 with its nozzle 72 extending through the plate and directed to the passing surface 14 of a panel 12 so that an ink drop ejected from the nozzle 72 moves from the nozzle to the surface along a generally horizontal flight path 74 in the absence of any path deflection provided by the apparatus 70. The nozzle 72 of the ink jet head 51 is comprised of a resilient material to permit nozzle movement. The nozzle 72 is coupled to a vibrating means 76 which causes the nozzle to move in a vertical direction indicated by direction arrow 78 generally perpendicular to the line of flight of an ink drop ejected from the nozzle. The vibrating means 76 might comprise, for example, a solenoid or a piezoelectric transducer. A randomizing circuit means 80 is driven by controller 32 to generate a randomly varying magnitude electric potential to drive the vibrating means 76 and the magnitude of nozzle movement is proportional to the magnitude of an electric potential applied to the vibrating means. Therefore, the nozzle movement is randomly varied by applying a randomly varying magnitude electric potential to the vibrating means to cause dots to be printed at positions randomly deviated vertically with respect to an ink jet scanning line.

Ink jet printing apparatus for vertically randomizing an ink drop flight path has been described in several preferred embodiments. It will be understood that numerous modifications and substitutions may be had without departing from the spirit of the invention. For example, in one embodiment of the invention an ink drop ejected from the nozzle can be deflected without charging the ink drop and such deflection techniques are generally well understood in the art. Therefore, the invention has been described by way of illustration rather than limitation.

We claim:

1. Ink jet printing apparatus including ink jet printing means and means for controlling and operating said ink jet printing means to apply or not apply dots to a plurality of dot positions located sequentially along a horizontal scan line scanned by said printing means, each of said dots having a higher density at its center than its periphery, said apparatus being characterized by:

flight path control means for vertically randomizing the flight paths of ink drops ejected from said printing means to print dots at positions randomly deviated vertically with respect to said line scanned by said printing means, said flight path control means including, deflection plates for supporting a deflection field to deflect the flight path of an ejected ink drop passing therebetween, each of said ejected drops being subjected to said field for substantially the same amount of time;

deflection voltage source means coupled to said deflection plates to create an electric field between said plates, and variable amplitude control means coupled to said deflection voltage source means, said voltage source means having circuit means for producing a randomly varying magnitude electric potential to produce a bipolar electric field having a randomly varying intensity the magnitude of which at each instant in time is related to the magnitude of said electrical potential to randomly deflect the ink drop flight path in a vertical direction generally perpendicular to the line of flight with respect to said scan line and within a predetermined range above and below said scan line, and at least some of said ink drop flight paths being different than other ink drop flight paths along said scan line so that dots associated with said at least some flight paths along one scan line overlap at least some of said dots located along another scan line immediately adjacent to said one scan line.

2. Ink jet printing apparatus as defined in claim 1 further characterized by said printing means comprising a number of ink jet printing heads fixed relative to one another in a vertically adjacent relationship perpendicular to the direction of the horizontal scan line, each of the heads of said number of heads printing dots at dot positions located sequentially along a horizontal line scanned by a said head and a number of said horizontal lines printed by a like number of said heads forming a pixel band.

3. Ink jet printing apparatus as defined in claim 2 further characterized in that a pixel band has at least an uppermost line and a lowermost line and one of which lines is printed by vertically randomizing the flight paths of ink drops ejected from the head associated with printing said one line.

4. Ink jet printing apparatus as defined in claim 2 further characterized in that a pixel band has at least an uppermost line and a lowermost line and both of which lines are printed by vertically randomizing the flight paths of ink drops ejected from each of the heads associated with printing said uppermost and lowermost lines respectively.

5. Ink jet printing apparatus as defined in claim 2 further characterized in that all the lines of a pixel band are printed by vertically randomizing the flight paths of ink drops ejected from each of the heads associated with printing each of the lines.

6. Ink jet printing apparatus as defined in claim 1 characterized in that said means flight path control means further comprises means for electrostatically charging ink drops ejected from said ink jet printing means.

7. Ink jet printing apparatus including ink jet printing means and means for controlling and operating said ink jet printing means to apply or not apply dots to a plurality of dot positions located sequentially along a horizontal scan line scanned by said printing means, each of said dots having a higher density at its center than its periphery, said apparatus being characterized by:

flight path control means for vertically randomizing the flight paths of ink drops ejected from said printing means to print dots at positions randomly deviated vertically with respect to said line scanned by said printing means;

said flight path control means including:

said ink jet printing means having a nozzle made from a resilient material;

vibrating means coupled to said nozzle for moving the nozzle in a vertical direction generally perpendicular to the line of flight with respect to said scan line and within a predetermined range above and below said scan line, and circuit means for producing a randomly varying magnitude electric potential to excite said vibrating means, said nozzle moving in response to said vibrating means such that at least some of said ink drop flight paths are randomly different than other ink drop flight paths along said scan line so that dots associated with said at least some flight paths along one scan line overlap at least some of said dots located along another scan line immediately adjacent to said one scan line.

8. Ink jet printing apparatus as defined in claim 7 further characterized in that said vibrating means comprises a piezoelectric transducer.

9. Ink jet printing apparatus as defined in claim 7 further characterized in that said vibrating means comprises a solenoid.

10. Ink jet printing apparatus as defined in claim 7 further characterized by said printing means comprising a number of ink jet printing heads fixed relative to one another in a vertically adjacent relationship perpendicular to the direction of the horizontal scan line, each of the heads of said number of heads printing dots at dot positions located sequentially along a horizontal line scanned by a said head and a number of said horizontal lines printed by a like number of said heads forming a pixel band.

11. Ink jet printing apparatus as defined in claim 10 further characterized in that a pixel band has at least an uppermost line and a lowermost line and one of which lines is printed by vertically randomizing the flight paths of ink drops ejected from the head associated with printing said one line.

12. Ink jet printing apparatus as defined in claim 10 further characterized in that a pixel band has at least an uppermost line and a lowermost line both of which lines are printed by vertically randomizing the flight paths of ink drops ejected from each of the heads associated with printing said uppermost and lowermost lines respectively.

13. Ink jet printing apparatus as defined in claim 10 further characterized in that all the lines of a pixel band are printed by vertically randomizing the flight paths of ink drops ejected from each of the heads associated with printing each of the lines.

* * * * *